Jan. 21, 1958

G. L. BEERS 2,820,844

COLOR TELEVISION SYSTEMS

Filed March 1, 1952

INVENTOR
George L. Beers
BY
[signature]
ATTORNEY

United States Patent Office 2,820,844

Patented Jan. 21, 1958

2,820,844

COLOR TELEVISION SYSTEMS

George L. Beers, Haddonfield, N. J., assignor to Radio Corporation of America, a corporation of Delaware Application March 1, 1952, Serial No. 274,417

5 Claims. (Cl. 178—5.2)

This invention relates in general to color television systems and in particular to such systems wherein the picture information is translated into two sets of signals respectively comprising luminance and chromaticity components.

It has been recognized that certain systems of color television may utilize a band-width comparable to that of the presently adopted United States standards for monochrome or black and white television. In these systems there is in addition to the luminance component which alone would produce a monochrome picture, the chromaticity or color component which determines the hue and saturation of the colors. In systems of this type it has been found that in the interest of conserving frequency spectrum the two sets of signals may be transmitted in such a way that they occupy all or a part of the same bandwidth. One method by which this is accomplished is to transmit the brightness or luminance component in the same manner as employed for standard monochrome transmission and to utilize a subcarrier modulated in amplitude and phase to convey the chrominance information. With this method it is possible that some crosstalk or interference may occur during certain unusual signal conditions by the heterodyning of one signal with the other.

With color television systems of this type, and the proper choice of standards, existing black and white receivers, without modification, will receive black and white pictures of excellent quality from the color transmissions. Color television systems meeting this requirement have been classified as compatible.

In compatible systems, precautions otherwise necessary to prevent crosstalk need not be taken if the luminance and chrominance channels are not permitted to overlap in the same frequency range.

Theater television systems have been proposed not having overlap in the luminance and chrominance channels. Such systems require a greater bandwidth than permitted by the presently accepted United States television standards for general broadcast purposes. When the two signals occupy separate frequency bands, greater freedom is possible in choosing standards. For example, the color subcarrier frequency need not be interlaced, and color sequence reversal may be made at a line rate rather than a field rate.

The advantages of conserving the frequency spectrum are, however, of such importance that it becomes highly desirable to transmit the luminance and chrominance information in the same frequency band if all spurious and undesired effects can be avoided.

Accordingly it is an object of the present invention to provide a color television system in which the effects caused by crosstalk between the monochrome and color signal components are minimized.

It is another object of the invention to provide a system for communicating two sets of signals representing luminance and chrominance components of a color picture in the same frequency channel with a minimum of interference between the sets of signals.

It is a further object of the invention to provide an improved color television system which may be compatible with monochrome standards and which affords a high degree of isolation between the luminance and chrominance channels.

Therefore in accordance with the invention two sets of signals preferably comprising luminance (brightness) and chrominance (color) information for color picture reproduction purposes are correlated with different propagation field polarization patterns. The two sets of signals are thus correlated in such a manner that interference between the two sets of signals is minimized. When the two sets of signals comprise the brightness and color components of the color picture respectively the brightness signal may be horizontally polarized to provide at the conventional horizontally polarized television receiving antenna compatible black and white picture information. The color information is vertically polarized so that there is relatively little color information picked up with the black and white picture.

Propagation tests have shown that a 30 db isolation may be maintained between the two sets of signals one of which is vertically polarized and the other of which is horizontally polarized. It is therefore seen that in accordance with the present invention a color television system may be provided affording the advantages of separate frequency bands for the luminance and chrominance signals although both are transmitted within the same frequency band.

Little departure may be expected from the propagated plane of polarization, as is recognized from the normal horizontal television antenna orientation used with the fifteen million existing receivers throughout the country to provide optimum reception from the horizontally polarized monochrome signals. Even should reflections and propagation vagaries temporarily disturb the polarization of one or both signals so that the desired isolation is lost, the crosstalk when compatible standards are used can become no worse than with present systems wherein the brightness and color information are both horizontally polarized. The probability of location of the antenna at a position affording rotation of the vertically polarized component into the horizontal plane for even a single television station is very small and therefore the presently proposed system offers greatly improved performance.

The organization of the invention together with its mode of operation may best be understood by a consideration of the following description together with the accompanying drawings, in which.

Figure 1:
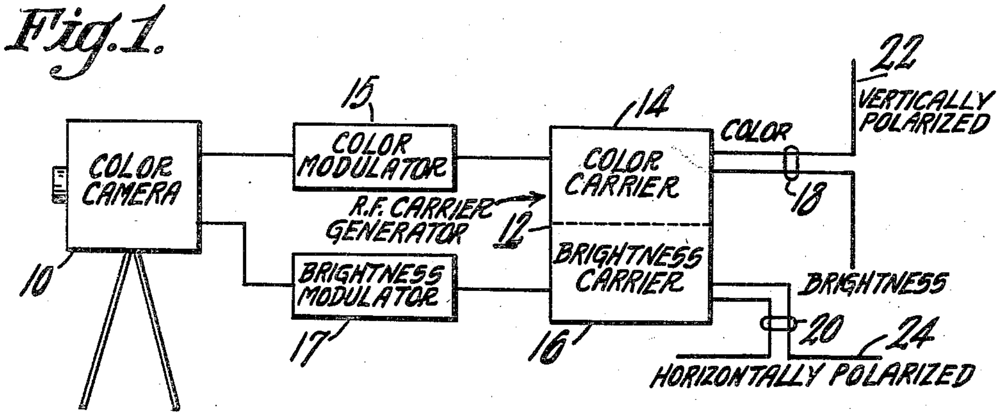
Figure 1 is a block diagram of a color television transmitter embodying the invention.

In the transmitter of Figure 1 a color camera 10 provides two sets of electronic signals corresponding to the color and brightness picture information. The details of the particular circuits used are not of themselves a part of the present invention and accordingly to better illustrate the nature of the present invention detailed circuit descriptions are not provided. Those skilled in the art may readily practice the present invention, however, with existing equipment by utilizing the well known techniques of television transmission, wherein the brightness signal is transmitted by modulating the picture carrier wave without substantial color discrimination (as is done in monochrome transmissions) and the color information is transmitted by means of a subcarrier the phase and amplitude of which determine the hue and saturation of the colors. Such systems are described in the article by B. D. Loughlin entitled Recent improvements in band-shared simultaneous color television systems published in the Proceedings of the IRE for October 1950 on page 1264. Since the brightness signal is transmitted in a manner similar to that used for standard black and white transmissions the signals can be received in monochrome on existing receivers without modification.

The transmitter 12 is divided into a color section 14 and a brightness section 16 modulated respectively by circuits 15 and 17 to provide separately signals modulated with color and brightness information. Separate isolated modulated output signals therefore are provided at the output cables 18 and 20.

A pair of separate propagating means, designated respectively by vertical and horizontal antenna sections 22 and 24, are employed for propagating the respective output signals with different polarization fields. The fields are preferably mutually perpendicular with the brightness signals being horizontally polarized to provide compatible signals without the possibility of degradation, which may result from interfering color information transmitted in the same frequency channel. In this manner the present invention provides an improved method of transmitting color television signals by separating the color picture into two sets of information, converting the information into electronic signals and propagating the signals in different polarization fields.

Figure 2:
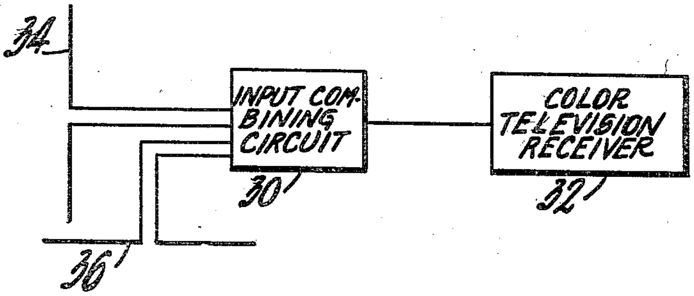
Figure 2 is a block diagram of a color television receiver capable of receiving color signals transmitted in accordance with the invention.

For operating the receiver portion of a color television system in accordance with the present invention the two sets of signals may be combined in the input circuit 30 of a color receiver 32 as shown in Figure 2. Combination of the signals by addition might be accomplished for example by one of the circuits described in chapter 18 of the Radiation Laboratory Series book entitled Waveforms published by McGraw-Hill Book Co., Inc., in 1949. A suitable antenna is used having both vertical 34 and horizontal 36 sections for receiving the signals in both planes of polarization.

In order to achieve optimum performance in a color receiver it may be desirable to isolate the color and brightness information in the receiver, and there may be provided separate color and brightness channels 40 and 42 along with suitable color and brightness demodulator devices 41 and 43. These channels may be connected to the cathodes and grids respectively of a three gun color kinescope 44. The kinescope thereby operates in the same manner as in the present color subcarrier systems utilizing the bypassed brightness principle of color operation discussed in the above reference I. R. E. article.

Figures 3, 4:
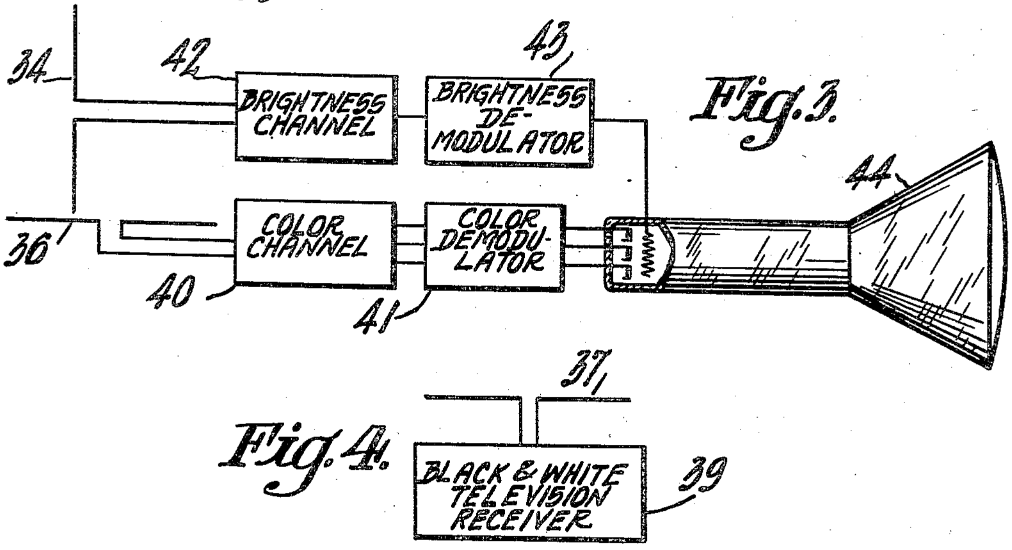
Figure 3 is a block diagram of a further color television receiver constructed in accordance with one embodiment of the invention.
Figure 4 is a block diagram of a conventional black and white television receiver operable in accordance with the present invention by signals from color cameras.

When an existing black and white receiver 39 as shown in Figure 4 is used with the conventional horizontally polarized antenna 37, operation is normally identical to that when a standard black and white signal is received. Only upon an abnormal disturbance of the vertically polarized field will any color information interference effects be possible in the black and white receiver, even though interlacing of the subcarrier is not afforded.

Therefore in accordance with the present invention, by correlating two sets of electronic signals with a pair of propagation fields and by correlating the two sets of signals with separate portions of color picture intelligence, color systems may be simplified. Thus the effects of crosstalk which may be found in restricted bandwidth television systems in the absence of color subcarrier interlace is substantially eliminated without degrading picture quality. Accordingly, compatible color television pictures may be transmitted by simplified apparatus utilizing two sets of signals occupying the same frequency band without interference.

Having thus described the invention and its mode of operation, those features of novelty believed descriptive of the nature of the invention are defined with particularity in the appended claims.

What is claimed is:

1. Apparatus for transmitting compatible color television signals comprising in combination, means generating a first carrier, means for generating a color television picture brightness information signal, means modulating said carrier with said picture brightness signal information to provide a first transmission signal, means generating a second carrier, means for generating a color television picture color information signal, means modulating said second carrier with said picture color information signal to provide a second transmission signal, means for propagating only the first transmission signal in a given propagation field, and means for propagating only the second transmission signal in a propagation field mutually perpendicular to said given field.

2. The method of transmitting color television signals comprising the step of polarizing the picture brightness information in one propagation field and polarizing the picture color information in a mutually prependicular propagation field.

3. Apparatus for transmitting compatible color television signals comprising in combination, means generating a carrier wave, means modulating said carrier wave with picture luminance signals to provide a first signal, means generating a subcarrier wave, means modulating said subcarrier wave with picture chrominance signals to provide a second signal, means propagating said first signal in a predetermined plane of polarization and means propagating the second signal in a plane of polarization mutually prependicular to the first said plane of polarization.

4. A color television receiver adapted for operation with picture transmission signals having separate signal components propagated in two mutually exclusive planes of polarization comprising in combination antenna means oriented to simultaneously and exclusively receive signals in said two planes of polarization, and color television receiver circuits connected to said antenna means for reconstituting from said signal components a color picture.

5. In a color television receiving system for receiving and reproducing color television images from first and second radio carriers, said first carrier bearing chrominance information relating to a given television scene, the second carrier having luminance information relating to the same scene, the field polarization of said first and second carriers being substantially perpendicular to one another, the combination of: a first antenna having a selective polarization pattern so oriented for response to substantially only said first carrier; a second antenna having a selective polarization pattern so oriented for response to substantially only said second carrier; a first signal processing means coupled with said first antenna for developing a color television chrominance signal; a second signal processing means coupled with said second antenna for developing a color television luminance signal simultaneously with the development of said chrominance signal and means coupled with said last two named means for producing a complete television picture in response to said chrominance and luminance signals.

References Cited in the file of this patent

UNITED STATES PATENTS

| | | |
|---|---|---|
| 2,129,712 | Southworth | Sept. 13, 1938 |
| 2,260,315 | Halstead | Oct. 28, 1941 |

OTHER REFERENCES

Television, vol. VI, pages 270 and 271, "A Six Megacycle Compatible High Definition Color Television System," published by RCA Review.